(12) United States Patent
Lee et al.

(10) Patent No.: US 9,231,275 B2
(45) Date of Patent: Jan. 5, 2016

(54) METHOD FOR MANUFACTURING SULFIDE-BASED SOLID ELECTROLYTE

(71) Applicant: Electronics and Telecommunications Research Institute, Daejeon (KR)

(72) Inventors: Young-Gi Lee, Daejeon (KR); Kwang Man Kim, Daejeon (KR); Kunyoung Kang, Daejeon (KR); Dong Ok Shin, Daejeon (KR); Yun Sung Lee, Gwangju (KR); Amaresh S, Gwangju (KR); Kwang Jin Kim, Gwangyang-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/334,251

(22) Filed: Jul. 17, 2014

(65) Prior Publication Data

US 2015/0024281 A1     Jan. 22, 2015

(30) Foreign Application Priority Data

Jul. 22, 2013 (KR) .................. 10-2013-0086203
Jan. 28, 2014 (KR) .................. 10-2014-0010747

(51) Int. Cl.
*H01M 10/0562* (2010.01)
*H01M 10/052* (2010.01)

(52) U.S. Cl.
CPC ........ *H01M 10/0562* (2013.01); *H01M 10/052* (2013.01); *H01M 2300/0068* (2013.01)

(58) Field of Classification Search
CPC .......... H01M 10/0562; H01M 10/052; H01M 2300/0068
See application file for complete search history.

(56) References Cited

U.S. PATENT DOCUMENTS

| 7,399,556 | B2 | 7/2008 | Lee et al. | |
| 2007/0160911 | A1 | 7/2007 | Senga et al. | |
| 2013/0040208 | A1* | 2/2013 | Kanno | C01B 17/20 429/319 |
| 2015/0214572 | A1* | 7/2015 | Kato | H01M 10/0562 429/319 |

FOREIGN PATENT DOCUMENTS

| EP | 0469574 A1 | 2/1992 |
| EP | 1365470 A1 | 11/2003 |
| JP | 2002-109955 A | 4/2002 |

OTHER PUBLICATIONS

Akitoshi Hayashi, et al., "Amorphous solid electrolytes in the system $Li_2S$-$Al_2S_3$-$SiS_2$ prepared by mechanical milling", Journal of Materials Science, vol. 39, pp. 5125-5127, Aug. 2004.

Noriaki Kamaya et al., "A lithium superionic conductor", Nature Materials, vol. 10, pp. 682-686, Sep. 2011.

Yuji Ooura et al., "Electrochemical properties of the amorphous solid electrolytes in the system $Li_2S$-$Al_2S_3$-$P_2S_5$", Solid State Ionics, vol. 225, pp. 350-353, Oct. 2012.

* cited by examiner

*Primary Examiner* — Muhammad Siddiquee
(74) *Attorney, Agent, or Firm* — Rabin & Berdo, P.C.

(57) ABSTRACT

Provided is a method for manufacturing a sulfide-based solid electrolyte including preparing a precursor comprising lithium sulfide, germanium sulfide, aluminum sulfide, phosphorus sulfide, and sulfur, conducting a mixing process of the precursor to prepare a mixture, and crystallizing the mixture to form a compound represented by $Li_{9.7}Al_{0.3}Ge_{0.7}P_2S_{12}$. The sulfide-based solid electrolyte may have high ionic conductivity.

3 Claims, 4 Drawing Sheets

METHOD FOR MANUFACTURING SULFIDE-BASED SOLID ELECTROLYTE

CROSS-REFERENCE TO RELATED APPLICATIONS

This U.S. non-provisional patent application claims priority under 35 U.S.C. §119 of Korean Patent Application Nos. 10-2013-0086203, filed on Jul. 22, 2013, and 10-2014-0010747, filed on Jan. 28, 2014, the entire contents of which are hereby incorporated by reference.

BACKGROUND

The present disclosure herein relates to a lithium battery, and more particularly, to a method for manufacturing a sulfide-based solid electrolyte.

As the significance of energy storage and transformation technique increases, interest in a lithium battery is largely increasing. The lithium battery may include an anode, a separator, a cathode and an electrolyte. The electrolyte plays the role of a medium for the movement of ions between the cathode and the anode. Since the lithium battery has high energy density when compared to other batteries, researches on the lithium battery are actively conducted. Recently, the lithium battery is applied in an electric vehicle as well as a portable electronic equipment such as a smart phone or a laptop computer. For a medium and large size lithium battery, the accomplishment of stable and good performance under a severe operating environment is required.

The electrolyte of a lithium battery may include an organic liquid electrolyte and an inorganic solid electrolyte. The organic liquid electrolyte includes a lithium salt dissolved therein, and is widely used because of the high ionic conductivity and the stable electrochemical properties thereof. However, the organic liquid electrolyte includes many defects concerning stability due to flammability, volatility, and leakage thereof. Among the inorganic solid electrolyte, a complex solid electrolyte receives attention on the bases of its high conductivity, low processing cost, and stability.

SUMMARY

The present disclosure provides a method for manufacturing a sulfide-based solid electrolyte having high ionic conductivity.

The present disclosure also provides a method for manufacturing a sulfide-based solid electrolyte having high performance.

The tasks to be solved by the present inventive concept is not limited to the above-described tasks, however other tasks not mentioned will be precisely understood from the following description by a person skilled in the art.

Embodiments of the inventive concept provide methods for manufacturing a sulfide-based solid electrolyte including preparing a precursor comprising lithium sulfide, germanium sulfide, aluminum sulfide, phosphorus sulfide, and sulfur, conducting a mixing process of the precursor to prepare a mixture, and crystallizing the mixture to form a compound represented by $Li_{9.7}Al_{0.3}Ge_{0.7}P_2S_{12}$.

In some embodiments, the mixing process may be conducted by a ball milling process using an inert gas.

In other embodiments, the crystallizing of the mixture may be conducted at about 500° C. to about 600° C. for about 6 hours to about 8 hours.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the reference numerals and description, serve to explain principles of the inventive concept. In the drawings.

DETAILED DESCRIPTION OF THE EMBODIMENTS

Figure 1:
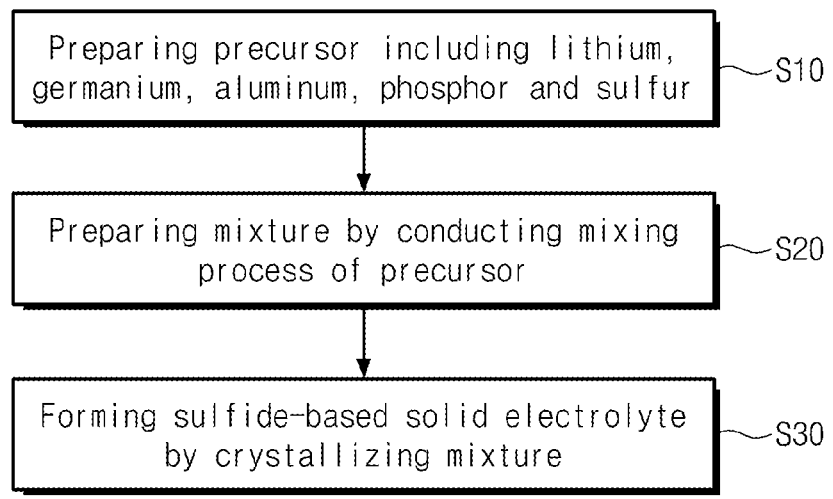
FIG. 1 is a flowchart illustrating a method for manufacturing a sulfide-based solid electrolyte according to an embodiment of the inventive concept.

Exemplary embodiments of the inventive concept will be described below in more detail with reference to the accompanying drawings to sufficiently understand the constitution and effects of the inventive concept. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

The terminology used herein is for the purpose of describing particular example embodiments only and is not intended to limit the present inventive concept. As used herein, the singular forms are intended to include the plural forms as well, unless the context clearly indicates otherwise. It will be further understood that the terms "comprises" and/or "comprising," when used in this specification, specify the presence of stated features, steps, operations, and/or devices, but do not preclude the presence or addition of one or more other features, steps, operations, and/or devices thereof.

Example embodiments embodied and described herein may include complementary example embodiments thereof. Like reference numerals refer to like elements throughout.

It will be further understood that terms should be interpreted as having a meaning that is consistent with their meaning in the context of the relevant art and will not be interpreted in an idealized or overly formal sense unless expressly so defined herein.

Hereinafter, a method for manufacturing a solid electrolyte according to an embodiment of the inventive concept will be described in detail.

FIG. 1 is a flowchart illustrating a method for manufacturing a sulfide-based solid electrolyte according to an embodiment of the inventive concept.

Referring to FIG. 1, a precursor including lithium, germanium, aluminum, phosphor, and sulfur may be prepared (S10). For example, lithium sulfide, germanium sulfide, aluminum sulfide, phosphorus sulfide, and sulfur are added to prepare the precursor. In an embodiment, the precursor may include about 4.6 mol to about 4.95 mol of the lithium sulfide represented by $Li_2S$, about 0.2 mol to about 0.9 mol of the germanium sulfide represented by GeS, about 0.05 mol to about 0.4 mol of the aluminum sulfide represented by $Al_2S_3$, about 1 mol of the phosphorus sulfide represented by $P_2S_5$, and about 1 mol of the sulfur represented by S.

A mixing process of the precursor may be conducted to prepare a mixture (S20). The mixing process may be conducted by a mechanical method such as ball milling. For example, the precursor may be ball milled in a rotation speed of about 500 times per minute for about 30 minutes. The mixing process may be conducted by using an inert gas such as argon. Accordingly, the reaction of the sulfur included in the precursor and the mixture with oxygen and moisture may be prevented. By the ball milling, the mixture may have a smaller average particle size than the precursor. Through the ball milling, the lithium, the germanium, the aluminum, the phosphor, and the sulfur included in the mixture may be more uniformly dispersed than the lithium, the germanium, the aluminum, the phosphor, and the sulfur included in the precursor. The mixture may have a solid state.

The shape or the size of the mixture thus prepared may be controlled so as to be appropriately applied in a lithium battery. For example, the mixture may be formed into a pellet or a film shape. As the mixture is formed into the solid state, the shape or the size of the mixture may be easily controlled. Alternatively, the controlling process of the shape or the size of the mixture may be omitted.

By crystallizing the mixture, a sulfide-based solid electrolyte may be manufactured (S30). The sulfide-based solid electrolyte may be a compound represented by $Li_{9.7}Al_{0.3}Ge_{0.7}P_2S_{12}$. The crystallization of the mixture may be conducted under the conditions of above a glass transition temperature, for example, at about 500° C. to about 600° C., more particularly, at about 550° C. The crystallization of the mixture may be conducted for about 6 to about 10 hours, for example, for about 8 hours. The lithium element, the germanium element, the aluminum element, the phosphor element, and the sulfur element may be uniformly distributed in the mixture. The sulfide-based solid electrolyte in which the mixture is crystallized may have high purity. The crystallization process of the mixture may be conducted under the conditions of an inert gas atmosphere. In this case, the reaction of the sulfur included in the mixture with oxygen or moisture contained in the air may be prevented. Thus, the sulfide-based solid electrolyte having even higher purity may be manufactured. The sulfide-based solid electrolyte represented by $Li_{9.7}Al_{0.3}Ge_{0.7}P_2S_{12}$ may include aluminum. Thus, the amount of the germanium element in the sulfide-based solid electrolyte may decrease. As the amount of the germanium element in the sulfide-based solid electrolyte decreases, the applicability of the sulfide-based solid electrolyte may increase further. For example, the sulfide-based solid electrolyte may be produced at low cost.

Hereinafter, the manufacture of the sulfide-based solid electrolyte according to the inventive concept and the evaluation results of the properties of the sulfide-based solid electrolyte will be explained in detail referring to experimental examples of the inventive concept.

Manufacture of Sulfide-Based Solid Electrolyte

Experimental Example 1

In a glove box charged with an argon gas, a bowl was placed. The moisture content in the glove box was controlled to about 1 ppm. About 4.85 mol of $Li_2S$, about 0.7 mol of GeS, about 0.15 mol of $Al_2S_3$, about 1 mol of $P_2S_5$, and about 1 mol of S were provided in the bowl to prepare a precursor. Each of $Li_2S$, GeS, $Al_2S_3$, $P_2S_5$, and S had a solid state. The precursor was ball milled under the conditions of the rotational rate of about 500 times per minute for about 30 minutes to prepare a mixture. The mixture was filled in a mold under an argon atmosphere. A pressure of about 30 kN was applied to the mold, and a mixture having a pellet shape having a thickness of about 5 mm was manufactured. The mixture pellet was provided in a furnace under an argon atmosphere. The mixture pellet was heat treated in the furnace at about 550° C. for about 8 hours. After that, the furnace was cooled to room temperature (about 25° C.) conditions.

Experimental Example 2

In a bowl of the same conditions as those in Experimental Example 1, about 4.9 mol of $Li_2S$, about 0.8 mol of GeS, about 0.1 mol of $Al_2S_3$, about 1 mol of $P_2S_5$, and about 1 mol of S were provided to prepare a precursor. A sulfide-based solid electrolyte of Experimental Example 2 was manufactured by performing the same procedure described in Experimental Example 1.

Experimental Example 3

In a bowl of the same conditions as that in Experimental Example 1, about 4.8 mol of $Li_2S$, about 0.6 mol of GeS, about 0.2 mol of $Al_2S_3$, about 1 mol of $P_2S_5$, and about 1 mol of S were provided to prepare a precursor. A sulfide-based solid electrolyte of Experimental Example 3 was manufactured by performing the same procedure described in Experimental Example 1.

Experimental Example 4

In a bowl of the same conditions as that in Experimental Example 1, about 4.7 mol of $Li_2S$, about 0.4 mol of GeS, about 0.3 mol of $Al_2S_3$, about 1 mol of $P_2S_5$, and about 1 mol of S were provided to prepare a precursor. A sulfide-based solid electrolyte of Experimental Example 4 was manufactured by performing the same procedure described in Experimental Example 1.

Experimental Example 5

In a bowl of the same conditions as that in Experimental Example 1, about 4.95 mol of $Li_2S$, about 0.9 mol of GeS, about 0.05 mol of $Al_2S_3$, about 1 mol of $P_2S_5$, and about 1 mol of S were provided to prepare a precursor. A sulfide-based solid electrolyte of Experimental Example 5 was manufactured by performing the same procedure described in Experimental Example 1.

Experimental Example 6

In a bowl of the same conditions as that in Experimental Example 1, about 4.6 mol of $Li_2S$, about 0.2 mol of GeS, about 0.4 mol of $Al_2S_3$, about 1 mol of $P_2S_5$, and about 1 mol of S were provided to prepare a precursor. A sulfide-based solid electrolyte of Experimental Example 6 was manufactured by performing the same procedure described in Experimental Example 1.

Comparative Example

In a bowl of the same conditions as that in Experimental Example 1, about 4.5 mol of $Li_2S$, about 0.5 mol of $Al_2S_3$, about 1 mol of $P_2S_5$, and about 1 mol of S were provided to prepare a precursor. However, GeS was not added in the precursor. A sulfide-based solid electrolyte of Comparative Example was manufactured by performing the same procedure described in Experimental Example 1.

Figure 2:
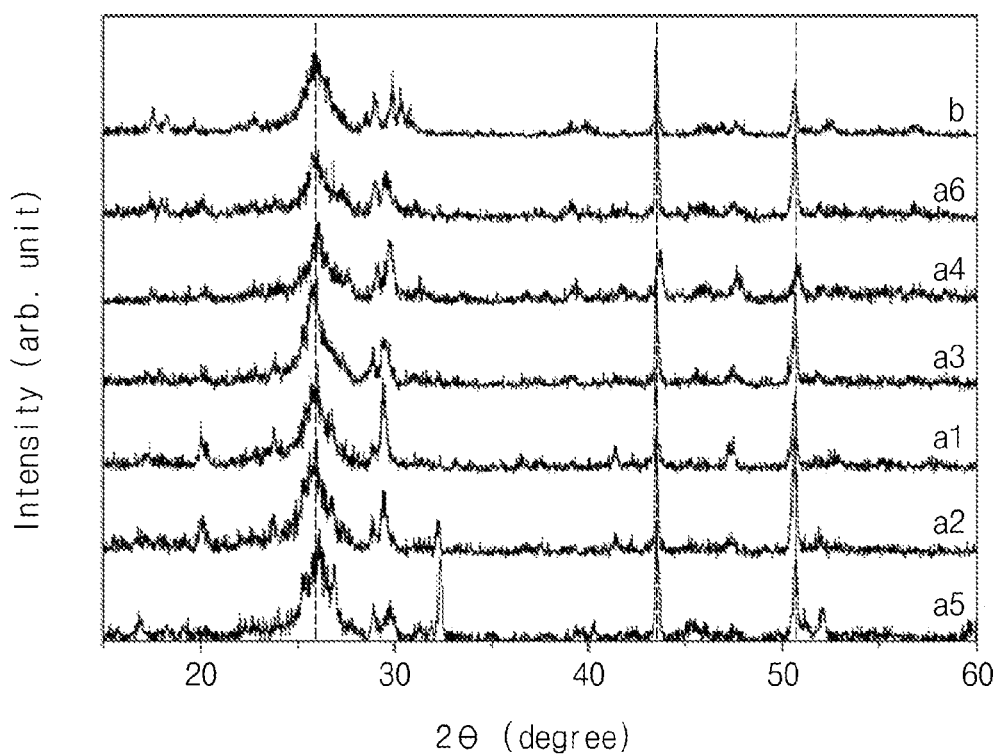
FIG. 2 is a graph illustrating X-ray diffraction analysis results according to experimental examples and a comparative example.

FIG. 2 is a graph illustrating X-ray diffraction analysis results according to experimental examples and a comparative example. Dotted lines represent the peaks of a sample holder provided with the sulfide-based solid electrolytes according to the experimental examples and the comparative example.

Referring to FIG. 2, the peaks for Experimental Example 1 (a1), Experimental Example 2 (a2), Experimental Example 3 (a3), Experimental Example 4 (a4), Experimental Example 5 (a5), Experimental Example 6 (a6), and Comparative Example (b) are illustrated at the degrees of 17.4±0.21, 18.02±0.24, 20.00±0.14, 23.82±0.38, 26.78±0.34, 28.84±0.20, 29.40±0.31, 39.32±0.05, 41.38±0.02, and 47.48±0.20. The peaks of for the experimental examples (a1, a2, a3, a4, a5, and a6) are in the same or similar peak range as those of the comparative example (b). From the results, it would be found that the crystalline structure of the sulfide-based solid electrolyte of the experimental examples (a1, a2, a3, a4, a5, and a6) is the same as or similar to that of the sulfide-based solid electrolyte of the comparative example (b).

The peaks of the precursor (lithium sulfide, germanium sulfide, aluminum sulfide, phosphorus sulfide, and sulfur) are not illustrated in the results of the experimental examples (a1, a2, a3, a4, a5, and a6). Through the mixing process of the precursor, the lithium element, the germanium element, the aluminum element, the phosphor element, and the sulfur element included in the mixture may be uniformly mixed. The sulfide-based solid electrolyte manufactured from the mixture may have high purity. According to the present invention, a sulfide-based solid electrolyte having a pure phase may be manufactured by controlling the conditions of the crystallization process.

Figure 3:
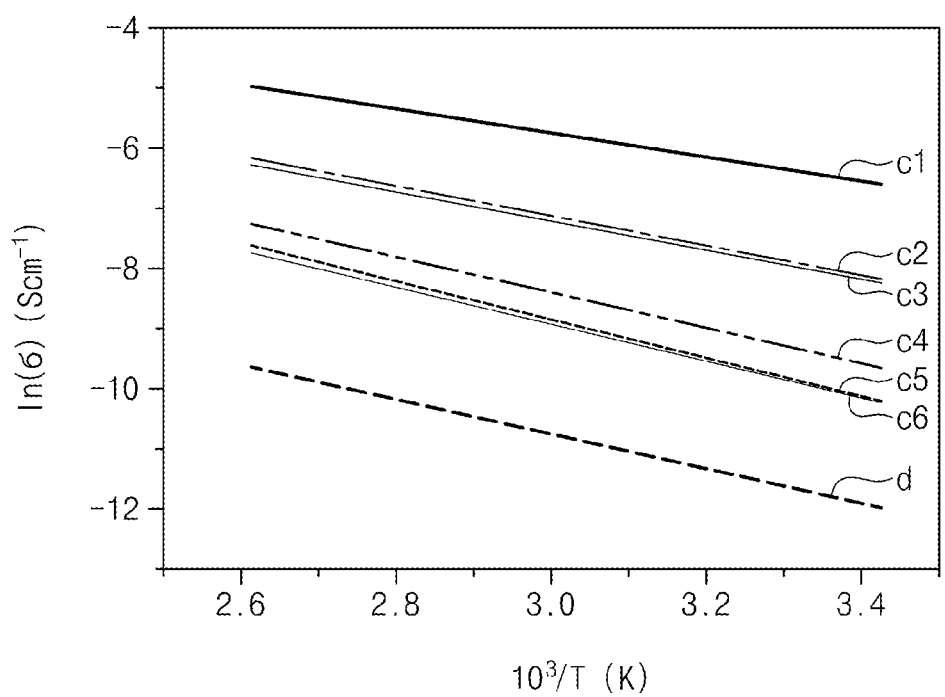
FIGS. 3 and 4 are graphs illustrating evaluation results according to experimental examples and a comparative example.
Figure 4:
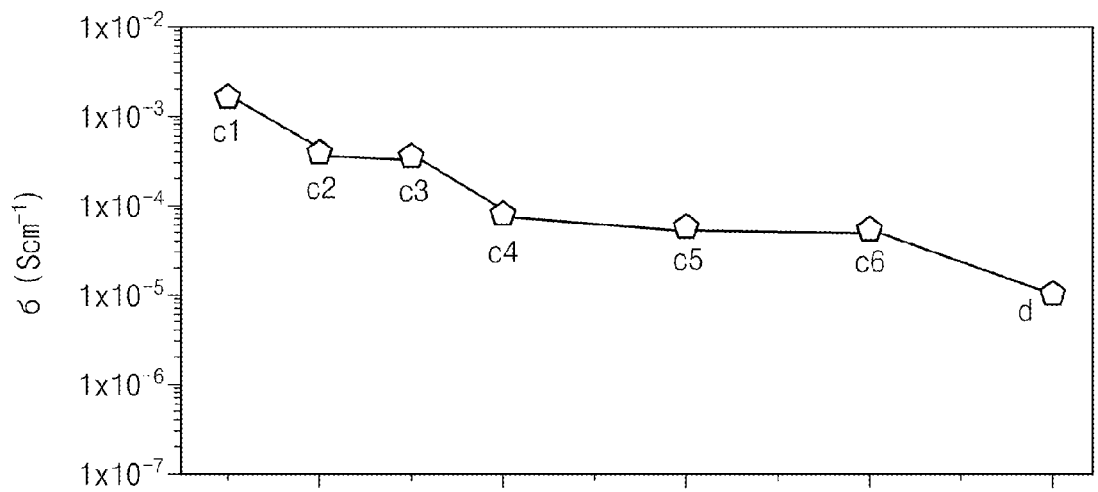

FIGS. 3 and 4 are graphs illustrating evaluation results according to experimental examples and a comparative example. FIG. 3 illustrates measured results on ionic conductivity with respect to temperature according to the experimental examples and the comparative example, and FIG. 4 illustrates measured results on ionic conductivity under conditions of about 25° C. according to the experimental examples and the comparative example.

Referring to FIGS. 3 and 4, it would be confirmed that each ionic conductivity of Experimental Example 1 (c1), Experimental Example 2 (c2), Experimental Example 3 (c3), Experimental Example 4 (c4), Experimental Example 5 (c5), and Experimental Example 6 (c6) is higher than that of Comparative Example (d). Since the sulfide-based solid electrolyte of the present invention has the chemical formula of $Li_{9.7}Al_{0.3}Ge_{0.7}P_2S_{12}$, high ionic conductivity may be obtained. The elements included in the mixture may be uniformly mixed through the ball milling process. The sulfide-based solid electrolytes according to the experimental examples (c1, c2, c3, c4, c5, and c6) have high purity and so may have high ionic conductivity.

Figure 5:
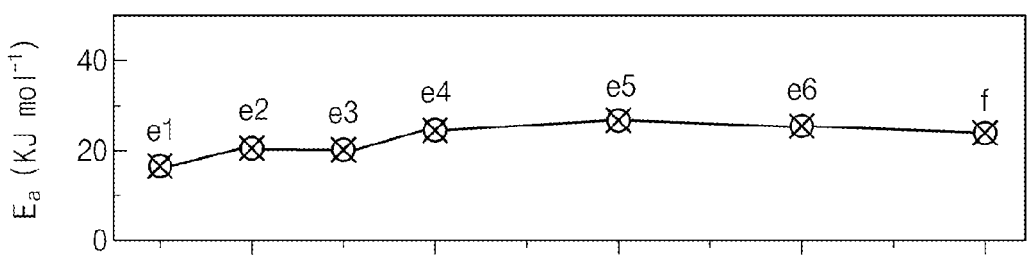
FIG. 5 is a graph illustrating evaluation results of activation energy according to experimental examples and a comparative example.

FIG. 5 is a graph illustrating evaluation results of activation energy according to experimental examples and a comparative example. The graph means the activation energy for the movement of lithium ions in the sulfide-based solid electrolyte.

Referring to FIG. 5, the activation energy of Experimental Example 1 (e1), Experimental Example 2 (e2), Experimental Example 3 (e3), Experimental Example 4 (e4), Experimental Example 5 (e5), and Experimental Example 6 (e6) is lower than or similar to that of Comparative Example (f). Since the sulfide-based solid electrolytes of the experimental examples (e1, e2, e3, e4, e5, and e6) include the aluminum element, the lithium ions may easily move in the sulfide-based solid electrolyte.

According to the inventive concept, a lithium element, an aluminum element, a germanium element, a phosphor element, and a sulfur element may be uniformly distributed in an intermediate by the mixing process of precursors. The sulfide-based solid electrolyte of the inventive concept may be manufactured by the crystallization process of the intermediate. The sulfide-based solid electrolyte may have high ionic conductivity and high purity. As the amount ratio of the germanium element in the sulfide-based solid electrolyte decreases, the applicability of the sulfide-based solid electrolyte may increase.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method for manufacturing a sulfide-based solid electrolyte, the method comprising:
   preparing a precursor comprising lithium sulfide, germanium sulfide, aluminum sulfide, phosphorus sulfide, and sulfur;
   conducting a mixing process of the precursor to prepare a mixture; and
   crystallizing the mixture to form a compound represented by $Li_{9.7}Al_{0.3}Ge_{0.7}P_2S_{12}$.

2. The method for manufacturing a sulfide-based solid electrolyte of claim 1, wherein the mixing process is conducted by a ball milling process using an inert gas.

3. The method for manufacturing a sulfide-based solid electrolyte of claim 1, wherein the crystallizing of the mixture is conducted at about 500° C. to about 600° C. for about 6 hours to about 8 hours.

* * * * *